US006989055B2

(12) United States Patent
Kitamura et al.

(10) Patent No.: US 6,989,055 B2
(45) Date of Patent: Jan. 24, 2006

(54) MONOAZO LAKE PIGMENT COMPOSITION AND GRAVURE INK USING THE SAME

(75) Inventors: Kenji Kitamura, Tokyo (JP); Shigeki Kato, Tokyo (JP); Hitoshi Maki, Tokyo (JP); Shoko Goto, Tokyo (JP); Motoi Shitaka, Tokyo (JP); Osamu Shiromaru, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 176 days.

(21) Appl. No.: 10/634,858

(22) Filed: Aug. 6, 2003

(65) Prior Publication Data

US 2004/0025748 A1 Feb. 12, 2004

(30) Foreign Application Priority Data

Aug. 7, 2002 (JP) .............................. 2002-229937

(51) Int. Cl.
*C09B 67/08* (2006.01)

(52) U.S. Cl. .................. 106/402; 106/31.79; 106/31.8; 106/496; 106/499; 534/579; 534/591

(58) Field of Classification Search ................ 106/402, 106/496, 499, 31.79, 31.8; 534/579, 581
See application file for complete search history.

(56) References Cited

U.S. PATENT DOCUMENTS

| 4,655,844 A | * | 4/1987 | Ueno et al. .................. 106/494 |
| 5,144,014 A | * | 9/1992 | Sugamo et al. .............. 534/573 |
| 5,243,031 A | * | 9/1993 | Sugamo et al. .............. 534/573 |
| 5,256,772 A | * | 10/1993 | Ohtomo ........................ 524/159 |
| 5,286,287 A | * | 2/1994 | Hirasawa et al. ........... 106/31.8 |
| 2004/0139880 A1 | * | 7/2004 | Metz et al. ................. 106/31.8 |

FOREIGN PATENT DOCUMENTS

| GB | 441493 | | 1/1936 |
| JP | 02-132161 A | * | 5/1990 |
| JP | 06-1852 A | * | 1/1994 |
| JP | 07-126546 A | * | 5/1995 |
| JP | 07-292274 A | * | 11/1995 |
| JP | 07-70460 A | * | 3/1996 |
| JP | 10-046086 A | * | 2/1998 |
| JP | 10-67955 A | * | 3/1998 |
| JP | 10-88016 A | * | 4/1998 |
| JP | 10-88020 A | * | 4/1998 |

OTHER PUBLICATIONS

Database WPI, Section Ch, Week 199602, Derwent Publications Ltd., London, GB; AN, 1996-017428, XP002261339, "Coating Treated Pigments and Gravure Printing Ink Compositions", Abstract of JP 07-292274A, Nov. 7, 1995.
Database WPI, Section Ch, Week 199406, Derwent Publications Ltd., London, GB; AN 1994-045515, XP002261340, "Aqueous Pigment Compositions and Dispersions With No Gelling for Gravure Printing Ink", Abstract of JP 06-001851A, Jan. 11, 1994.
Database WPI, Section Ch, Week 199817, Derwent Publications Ltd., London, GB; AN, 1998-189525, XP002261341, "Azo Lake Pigment Composition", Abstract of JP 10-046086A, Feb. 17, 1998.
Database WPI, Section Ch, Week 199026, Derwent Publications Ltd., London, GB; AN, 1990-198250, XP002261342, "Surface Treated Monoazo Lake Pigment", Abstract of JP 02-132161A, May 21, 1980.

* cited by examiner

*Primary Examiner*—Anthony J. Green
(74) *Attorney, Agent, or Firm*—Wenderoth, Lind & Ponack, L.L.P.

(57) ABSTRACT

A monoazo lake pigment composition containing a monoazo lake pigment obtained from a laked pigment aqueous slurry prepared by conducting coupling of a diazo component obtained by diazotizing an aromatic amine having a soluble group and a coupler component and conducting laking after or simultaneously with the coupling, wherein the laking is carried out in the presence of a water-soluble acrylic polymer in an amount of 0.1 to 40 parts by weight per 100 parts of the above coupler component, and a gravure ink containing the above pigment composition and a gravure ink vehicle.

6 Claims, No Drawings

MONOAZO LAKE PIGMENT COMPOSITION AND GRAVURE INK USING THE SAME

FIELD OF THE INVENTION

The present invention relates to a monoazo lake pigment improved in flowability, long-term stability, printability and the gloss of a printed matter, and a gravure ink using the above pigment.

PRIOR ARTS OF THE INVENTION

Monoazo lake pigments obtained by coupling an aromatic amine having a soluble group as a diazo component with β-oxynaphthoic acid or β-naphthol as a coupler component are widely used for various applications such as a printing ink, a coating composition and coloring of plastics. These monoazo lake pigments are controlled so as to have a finer particle shape for the purpose of making the color tone thereof transparent and clear. However, when the lake pigment is used in a gravure ink, there is a defect. That is, as particles of the pigment are made finer, agglomeration of the particles proceeds and an increase in the viscosity of the ink or gelation occurs, so that it can not be used. For overcoming the above defect, there are disclosed a pigment composition using a formalin condensate of an aromatic sulfonic acid as an additive (JP-A-62-18472) and a pigment composition using a water-soluble acrylic polymer as an additive (JP-A-7-2922749). However, these pigment compositions are insufficient for practical uses since these compositions are weak in the effect of decreasing a viscosity or insufficient in printability.

SUMMARY OF THE INVENTION

It is an object of the present invention to provide a pigment which, when used in a gravure ink, is excellent in flowability, long-term stability and printability and excellent in the gloss of a printed matter, and a gravure ink composition containing the above pigment.

The present invention provides a monoazo lake pigment composition containing a monoazo lake pigment obtained from a laked pigment aqueous slurry prepared by conducting coupling of a diazo component obtained by diazotizing an aromatic amine having a soluble group and a coupler component and conducting laking after or simultaneously with the coupling, wherein the laking is carried out in the presence of a water-soluble acrylic polymer in an amount of 0.1 to 40 parts by weight per 100 parts of the above coupler component.

The present invention further provides a monoazo lake pigment composition according to the above, wherein the monoazo lake pigment is surface-treated by further adding 0.1 to 30 parts by weight of a water-soluble acrylic polymer to 100 parts by weight (solid content) of the laked pigment aqueous slurry.

The present invention further provides a monoazo lake pigment composition according to the above, wherein the monoazo lake pigment is obtained by adding and mixing 0.1 to 30 parts by weight of a powder of a water-soluble acrylic polymer to/with 100 parts of a pigment separated from the laked pigment aqueous slurry by filtering and drying the aqueous slurry.

DETAILED DESCRIPTION OF THE INVENTION

Examples of the aromatic amine having a soluble group, which constitutes the diazo component of the present invention, include 2-chloro-5-aminotoluene-4-sulfonic acid, 4-aminotoluene-3-sulfonic acid, 4-chloro-aniline-3-sulfonic acid, anthranilic acid, 4-chloroanthranilic acid, 2-naphthylamine-1-sulfonic acid and sodium salts of these. Of these, a derivative of aminotoluene sulfonic acid is preferred.

The coupler component is preferably β-oxynaphthoic acid or β-naphthol, while it may be acetoacetanilides.

The present invention has a feature in that 0.1 to 40 parts by weight of the water-soluble acrylic polymer is added to 100 parts by weight of the coupler component at the laking time.

Examples of the water-soluble acrylicpolymer include an acrylic acid-maleic acid copolymer, a polyacrylic acid, a polymethacrylic acid, apolymaleic acid, an isobutylene-maleic acid copolymer, a styrene-acrylic acid copolymer, and sodium salts, potassium salts or ammonium salts of these. More specifically, it includes, POIZ 520, 530 and 540, DEMOL EP, P and LP (supplied by Kao Corporation), ARON-T40 and A-10SL (supplied by Toa Gosei Chemical Industry Co., Ltd.), Joncryl 67, 586, 611, 678, 680 and 683 (supplied by JOHNSON POLYMER CORPORATION), and JURYMER AC-10S and AC-20N (supplied by NIHON JUNYAKU CO., LTD.).

The amount of the water-soluble acrylic polymer of the present invention to be used at the laking time is preferably 0.1 to 40 parts by weight, more preferably 1 to 20 parts by weight, per 100 parts by weight of the coupler component in terms of solid content. When the above amount of the water-soluble acrylic polymer is smaller than the lower limit of the above range, the effect of the present invention is not found. When it is larger than the upper limit of the above range, an effect corresponding to an amount added can not be obtained.

The monoazo lake pigment of the present invention can be produced according to a conventionally known production process of a monoazo lake pigment. That is, the aromatic amine having a soluble group is diazotized according to a general method. On the other hand, a coupler component is prepared according to a general method. Then, both the components are coupled to obtain a dye. The water-soluble acrylic polymer is added to the dye and then the dye is laked by using a metal for pigment laking. Otherwise, there may be adopted a process in which a metal for pigment laking is added to the diazo component or the coupler component, on the other hand, the water-soluble acrylic resin is added to the coupler component in advance, and the coupling and the laking in the presence of an acrylic aqueous solution are carried out simultaneously. Examples of the metal for pigment laking include calcium, barium, strontium and manganese.

It is preferred that 0.1 to 30 parts by weight, more preferably 1 to 20 parts by weight, of the water-soluble acrylic polymer is added and mixed to/with 100 parts by weight (solid content) of the laked pigment aqueous slurry to surface-treat the monoazo lake pigment. The above mixing of the water-soluble acrylic polymer promotes the effect of the present invention. When the addition amount of the water-soluble acrylic polymer is smaller than the lower limit of the above range, the effect of promoting the effect of the present invention is small. When it is larger than the upper limit of the above range, an effect corresponding to an amount added can not be obtained. The water-soluble acrylic resin is preferably added in the form of an aqueous solution, while it may be added in the form of a powder.

It is preferred to add and mix the water-soluble acrylic polymer in an amount of, preferably, 0.1 to 30 parts by weight, more preferably 1 to 20 parts by weight, to/with 100 parts by weight of dried pigment obtained by filtering and drying the laked pigment aqueous slurry. The above mixing of the water-soluble acrylic polymer promotes the effect of the present invention. When the addition amount of the water-soluble acrylic polymer is smaller than the lower limit of the above range, the effect of promoting the effect of the present invention is small. When it is larger than the upper limit of the above range, an effect corresponding to an amount added can not be obtained.

As for the structure of the gravure ink of the present invention, for example, the gravure ink is composed of 10 to 80 parts by weight a resin, 10 to 80 parts by weight of an ink solvent, 5 to 35 parts by weight of the pigment composition of the present invention and 0 to 20 parts by weight of an extender pigment. Further, it may contain, as other auxiliary agents, a plasticizer, an ultraviolet inhibitor, an antioxidant, an antistatic agent, a leveling agent, an antifoamer, wax, etc., as required.

Examples of the resin include gum rosin, wood rosin, tall oil rosin, rosin ester, limed hardened rosin, zinc-modified hardened rosin, maleic-modified rosin, fumaric-modified rosin, cellulose nitrate, ethyl cellulose, polyamide, polyurethane, cyclized rubber, chlorinated rubber and an acrylic resin. Examples of the ink solvent include aromatic hydrocarbon, aliphatic hydrocarbon, alcohol, ester, a ketone solvent, water and the like, e.g. toluene, xylene, ethyl acetate, acetone, normal hexane, isopropyl alcohol or water. Examples of the extender pigment include barium sulfate, barium carbonate, calcium carbonate, plaster, alumina white, clay, silica, silica white, talc, calcium silicate or precipitated magnesium carbonate. These resins, solvents and pigments may be used alone or in combination respectively.

The monoazo lake pigment composition of the present invention can be used for an ink such as an offset ink or for coloring of a molded plastic in addition to for a gravure ink.

EXAMPLES

The present invention will be explained more in detail with reference to Examples hereinafter. In Examples, "part" stands for "part by weight" and "%" stands for "% by weight".

Example 1

16.8 parts of sodium hydroxide and 78.5 parts of 4-aminotoluene-3-sulfonic acid were dissolved in 932 part of water, to obtain a solution. 105 parts of 35% hydrochloric acid was added to the solution. Then, 840 parts of ice was added to the resultant solution, to cool it down to 0° C., and then 172 g of 35% calcium chloride was added. A solution composed of 95 part of water and 30 g of sodium nitrite was added to the resultant mixture and the mixture was stirred at 3° C. or lower for 45 minutes, to obtain a diazo component.

91 parts of β-oxynaphthoic acid was dissolved in a solution composed of 2,100 part of water and 44.5 parts of sodium hydroxide and the resultant solution was cooled down to 15° C. 18.7 parts of a 30% solution (30 parts of Joncryl 678, 3.8 parts of sodium hydroxide and 66.2 part of water) of Joncryl 678 (a water-soluble acrylic resin supplied by JOHNSON POLYMER CORPORATION) was added to the cooled solution, to obtain a coupler component. The diazo component was dropwise added to the coupler component over 30 minutes, and stirring was continued for 30 minutes to advance a laking reaction. Then, the reaction mixture was heated up to 85° C. and stirring was continued for 30 minutes to terminate the laking reaction, whereby a laked pigment slurry was obtained. The pH of the slurry was adjusted with 35% hydrochloric acid to 4.5~5.0, and then the slurry was stirred for 30 minutes. Then, filtration, washing with water and drying were carried out to obtain a pigment composition.

Example 2

100 parts (solid content) of the same laked pigment slurry as that obtained in Example 1 was heated up to 85° C. and then stirred for 30 minutes. Then, its pH was adjusted with 35% hydrochloric acid to 4.5~5.0. Further, 40 parts of a 30% solution of Joncryl 678 was added and the resultant mixture was stirred for 30 minutes. Then, filtration, washing with water and drying were carried out to obtain a pigment composition.

Example 3

12 parts of a powder of Joncryl 678 was added and mixed to/with 100 parts of the same dried pigment composition as that obtained in Example 1, to obtain a pigment composition.

Example 4

A pigment composition was obtained in the same manner as in Example 1 except that the amount of the 30% solution of Joncryl 678 used in Example 1 was decreased to 9.4 parts.

Example 5

100 parts (solid content) of the same laked pigment slurry as that obtained in Example 4 was heated up to 85° C. and then stirred for 30 minutes. Then, its pH was adjusted with 35% hydrochloric acid to 4.5~5.0. Further, 65 parts of a 30% solution of Joncryl 678 was added and the resultant mixture was stirred for 30 minutes. Then, filtration, washing with water and drying were carried out to obtain a pigment composition.

Example 6

19.5 parts of a powder of Joncryl 678 was added and mixed to/with 100 parts of the same dried pigment composition as that obtained in Example 4, to obtain a pigment composition.

Example 7

A pigment composition was obtained in the same manner as in Example 1 except that 78.5 parts of 4-aminotoluene-3-sulfonic acid used in Example 1 was replaced with a mixture of 76.5 parts of 4-aminotoluene-3-sulfonic acid and 2 parts of 2-aminonaphthalene-1-sulfonic acid and that the amount of the 30% solution of Joncryl 678 was decreased to 12 parts.

Example 8

A pigment composition was obtained in the same manner as in Example 7 except that the 30% solution of Joncryl 678 used in Example 7 was replaced with 3.6 parts (solid content) of DEMOL EP.

Example 9

A pigment composition was obtained in the same manner as in Example 7 except that the 30% solution of Joncryl 678 used in Example 7 was replaced with 2.0 parts (solid content) of POIZ 520.

Example 10

A pigment composition was obtained in the same manner as in Example 7 except that the 30% solution of Joncryl 678 used in Example 7 was replaced with 2 parts (solid content) of JURYMER AC-10S.

Comparative Example 1

A non-treated pigment was obtained in the same manner as in Example 1 except that the 30% solution of Joncryl 678 was not added.

Comparative Example 2

A comparative pigment was obtained in the same manner as in Example 1 except that 18.7 parts of the 30% solution of Joncryl 678 used in Example 1 was replaced with 28 parts (5.6 parts in terms of solid content) of rosin soap.

Comparative Example 3

A non-treated pigment was obtained in the same manner as in Example 7 except that the 30% solution of Joncryl 678 used in Example 7 was not added.

Then, the gravure ink suitability of each pigment obtained in the present invention will be shown.

The monoazo lake pigment composition obtained in each Example was tested by the following methods.

(Test methods)

1. Polyurethane type gravure ink

| Monoazo lake pigment composition | 10 parts |
| --- | --- |
| Polyurethane type varnish | 40 parts |
| Solvent (MEK) | 40 parts |
| Additive | 10 parts |

The above components together with 100 g of glass beads having a diameter of 5 mm were placed in a mayonnaise bottle having a volume of 225 ml and then dispersed with a paint conditioner for 90 minutes.

2. Aqueous gravure ink

| Monoazo lake pigment composition | 30 parts |
| --- | --- |
| Aqueous varnish | 30 parts |
| Water | 39 parts |
| Additive | 1 parts |

The above components together with 200 g of alumina beads having a diameter of 3 mm were placed in a mayonnaise bottle having a volume of 225 ml and then dispersed with a paint conditioner for 90 minutes.

Table 1 and Table 2 show results of the above gravure tests respectively.

Flowability right after the ink formation was measured with a BM type viscosimeter after an ink contained in a glass container was placed in a 25° C. thermostatic chamber. (Unit: cps)

Long-term flowability was measured after an ink contained in a glass container was preserved in a 40° C. thermostatic chamber for 4 days and then it was placed in a 25° C. thermostatic chamber for 1 hour.

Transparency was evaluated by visual observation of transparency of a film on which an obtained ink was extended. The results were expressed by ⊙, ○, Δ or X in order of from highest to lowest.

Gloss was measured by measuring a film, on which an ink was extended, with a gloss meter (60° C).

Resistance to clogging of a printing plate was evaluated by visual observation of ink impression properties of a printed matter after operating a small printer at a rate of 100 m/minute for 30 minutes. The results were expressed by ⊙, ○, Δ or X in order of from highest to lowest.

TABLE 1

Test results of polyurethane type gravure ink

| Evaluation item | Flowability Right after ink formation 6/60 rpm | After 4 days at 40° C. 6/60 rpm | Trans-parency | Gloss (%) | Resistance to clogging of printing plate |
| --- | --- | --- | --- | --- | --- |
| Example 1 | 430/300 | 740/540 | ⊙ | 82 | ○ |
| Example 2 | 60/60 | 460/350 | ⊙ | 80 | ⊙ |
| Example 3 | 60/60 | 430/330 | ⊙ | 80 | ⊙ |
| Example 4 | 390/270 | 540/390 | ○ | 82 | ○ |
| Example 5 | 75/70 | 140/110 | ○ | 79 | ⊙ |
| Example 6 | 70/70 | 250/180 | ○ | 78 | ⊙ |
| Comparative Example 1 | 410/270 | 500/350 | X | 75 | X |
| Comparative Example 2 | 450/320 | 1,050/760 | ⊙ | 83 | X |

TABLE 2

Test results of aqueous gravure ink

| Evaluation item | Flowability Right after ink formation 6/60 rpm | After 4 days at 40° C. 6/60 rpm | Trans-parency | Gloss (%) | Resistance to clogging of printing plate |
| --- | --- | --- | --- | --- | --- |
| Example 7 | 140/120 | 680/440 | ⊙ | 20 | ○ |
| Example 8 | 160/150 | 700/470 | ⊙ | 20 | ○ |
| Example 9 | 200/180 | 870/520 | ○ | 20 | ○ |
| Example 10 | 300/260 | 970/630 | ○ | 20 | ○ |
| Comparative Example 3 | 190/160 | 3,960/2,200 | X | 19 | Δ |

EFFECT OF THE INVENTION

According to the present invention, there are obtained a pigment and a gravure ink composition which are excellent in flowability, long-term stability, printability and the gloss of a printed matter, due to addition of the water-soluble acrylic polymer in the production of a monoazo lake pigment.

What is claimed is:

1. A monoazo lake pigment composition containing a monoazo lake pigment obtained from a laked pigment aqueous slurry prepared by conducting coupling of a diazo component obtained by diazotizing an aromatic amine having a soluble group and a coupler component, and conducting laking after or simultaneously with the coupling, wherein the laking is carried out in the presence of a water-soluble acrylic polymer in an amount of 0.1 to 40 parts by weight per 100 parts by weight of the above coupler component, and the monoazo lake pigment is surface-treated by further adding 0.1 to 30 parts by weight of a water-soluble acrylic polymer to 100 parts by weight (solid content) of the laked pigment aqueous slurry.

2. The monoazo lake pigment composition according to claim 1, wherein the diazo component is an aminotoluenesulfonic acid derivative and the coupler component is β-oxynaphthoic acid or β-naphthol.

3. A gravure ink comprising the pigment composition as recited in claim 1, and a gravure ink vehicle.

4. A monoazo lake pigment composition containing a monoazo lake pigment separated by filtering and drying a laked pigment aqueous slurry prepared by conducting coupling of a diazo component obtained by diazotizing an aromatic amine having a soluble group and a coupler component, and conducting laking after or simultaneously with the coupling, wherein the laking is carried out in the presence of a water-soluble acrylic polymer in an amount of 0.1 to 40 parts by weight per 100 parts by weight of the above coupler component, and 0.1 to 30 parts by weight of a powder of a water-soluble acrylic polymer is further added and mixed to/with 100 parts by weight of the pigment separated from the laked pigment aqueous slurry.

5. The monoazo lake pigment composition according to claim 4, wherein the diazo component is an aminotoluenesulfonic acid derivative and the coupler component is β-oxynaphthoic acid or β-naphthol.

6. A gravure ink comprising the pigment composition as recited in claim 4 and a gravure ink vehicle.

* * * * *